(12) United States Patent
Herbach (10) Patent No.: US 7,721,105 B1
(45) Date of Patent: *May 18, 2010

(54) REPURPOSING DIGITALLY SIGNED INFORMATION

(75) Inventor: Jonathan D. Herbach, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 12/023,956

(22) Filed: Jan. 31, 2008

Related U.S. Application Data (63) Continuation of application No. 10/427,433, filed on Apr. 30, 2003, now Pat. No. 7,353,397.

(51) Int. Cl.
*H04L 9/00* (2006.01)
*H04K 1/00* (2006.01)
*G06F 21/24* (2006.01)

(52) U.S. Cl. .................. 713/176; 713/194; 726/30

(58) Field of Classification Search ........... None
See application file for complete search history.

(56) References Cited

U.S. PATENT DOCUMENTS

| | | | |
|---|---|---|---|
| 5,940,513 A | 8/1999 | Aucsmith et al. | |
| 6,085,322 A | 7/2000 | Romney et al. | |
| 6,587,837 B1 | 7/2003 | Spagna et al. | |
| 6,587,945 B1 | 7/2003 | Pasieka | |
| 6,807,633 B1 | 10/2004 | Pavlik | |
| 6,938,157 B2 | 8/2005 | Kaplan | |
| 7,039,805 B1 | 5/2006 | Messing | |
| 7,353,397 B1 * | 4/2008 | Herbach | 713/176 |
| 2003/0217281 A1 | 11/2003 | Ryan | |
| 2004/0003139 A1 | 1/2004 | Cottrille et al. | |
| 2007/0005978 A1 | 1/2007 | O'Connor et al. | |
| 2007/0055885 A1 * | 3/2007 | Yamazaki et al. | 713/176 |

OTHER PUBLICATIONS http://www.w3/org/1999/05/XFA/xfa-template (World Wide Web Consortium (Gavin F. McKenzie (editor)), "XFA-Template Version 1.0", Jun. 14, 1999).

* cited by examiner

*Primary Examiner*—Christopher A Revak
(74) *Attorney, Agent, or Firm*—Fish & Richardson P.C.

(57) ABSTRACT

Methods and apparatus, including computer program products, implement techniques for repurposing digital information. One or more repurposing constraints are associated with information in an electronic document. A digital signature is associated with the repurposable information and the repurposing constraints. The repurposable information can be repurposed and represented as signed information subject to the repurposing constraints.

39 Claims, 6 Drawing Sheets

REPURPOSING DIGITALLY SIGNED INFORMATION

CROSS-REFERENCE TO RELATED APPLICATIONS

This application is a continuation and claims priority to U.S. application Ser. No. 10/427,433 (now U.S. Pat. No. 7,353,397), filed on Apr. 30, 2003, the entire contents of which are hereby incorporated by reference.

BACKGROUND

The present invention relates to digital rights management and signing electronic documents.

A digital signature, like a conventional handwritten signature, identifies a person or entity signing a document. Digital signatures allow a person to attest to something about a document by signing their name to it. Thus, for example, digital signatures can be used to authenticate and safeguard information by allowing authors and others to "sign" electronic documents with a unique electronic signature that identifies the person who applied it as having read, reviewed, or contributed to the document's creation. A digital signature can also verify that a document has not been altered since it was sent.

Key-based signatures encode an electronic document with an encrypted unique signature that positively identifies the person who applied the signature, when it was signed, and other user-determined information. Key-based systems can also control access to a document, allowing only certain persons holding certain keys to read or modify the document. In some applications, a digital signature in a document is bound to that document in such a way that repurposing the signed document—for example, altering the signed document or moving the signature to a different document—invalidates the signature.

SUMMARY OF THE INVENTION

The present invention provides methods and apparatus, including computer program products, for digitally signing information in an electronic document for reuse.

In general, in one aspect, the invention features methods and apparatus, including computer program products, implementing techniques for repurposing information in electronic documents. The techniques include identifying repurposable information in an electronic document, defining one or more repurposing constraints for the repurposable information, and associating a digital signature with the repurposable information and the repurposing constraints.

Particular implementations can include one or more of the following features. Identifying repurposable information in an electronic document can include designating a subset of information as being repurposable where the designated subset includes less than all of the information in the electronic document.

Defining one or more repurposing constraints can include designating a destination for the repurposable information. The techniques can also include receiving the repurposable information in a destination, validating that the receiving destination corresponds to the designated destination, and using the repurposable information as signed information in the receiving destination.

The digital signature can be encrypted and the designated destination can be provided with a decryption key to decrypt the digital signature. The digital signature can be decrypted with the decryption key prior to validation of the receiving destination.

The destination can represent one or more operations capable of being performed on the repurposable information or a document in which the repurposable information can be used. The one or more operations can include displaying the repurposable information. Displaying the repurposable information can include displaying the repurposable information in an arrangement different from an original arrangement in which the repurposable information is displayed. The destination can represent a user authorized to repurpose the repurposable information.

A template defining the destination can be created. Identifying repurposable information can include identifying repurposable information in response to user input. A template including one or more subsets of information can be created in the electronic document such that identifying repurposable information can include designating at least one of the one or more subsets of information as repurposable. A signature can be assigned to at least one of the one or more subsets of information.

In general, in another aspect, the invention features methods and apparatus, including computer program products, implementing techniques for repurposing a signed electronic document, where the electronic document includes repurposable information. The techniques include receiving an electronic document including repurposable information, repurposing constraints, and a digital signature, where the repurposing constraints define one or more authorized uses for the repurposable information, validating destination information in the repurposing constraints, and using the repurposable information as signed information.

Particular implementations can include one or more of the following features. The repurposed data can be represented as signed. The digital signature can be encrypted, and the technique can further include receiving a decryption key, and decrypting the digital signature using the decryption key.

In general, in another aspect, the invention features methods and apparatus, including computer program products, implementing techniques for assigning a signature to an electronic document. The techniques include displaying a representation of information in an electronic document, receiving user input designating information in the electronic document for repurposing, associating one or more repurposing constraints with the designated information, and generating a digital signature for the designated information and the specified repurposing constraints. The repurposing constraints define one or more authorized uses for the designated information.

In general, in another aspect, the invention features methods and apparatus, including computer program products, implementing data structures associated with an electronic document. The data structures include a subset of information of the electronic document, one or more constraints on repurposing assigned to the subset of information, and a signature assigned to the subset of information. The constraints define one or more authorized uses for the subset of information.

Particular implementations can include one or more of the following features. The repurposing constraints can include at least one identifier. The at least one identifier can include a hash of a destination assigned to at least one subset of data.

The invention can be implemented to realize one or more of the following advantages. Designating information in a signed electronic document for certain destinations allows information in the signed document to be repurposed as signed information for other authorized uses, while limiting repurposing to those authorized uses. Designating authorized uses can allow workflows to be signed end-to-end, and to be digitally verifiable. This allows workflows that include "subsequent" documents or databases.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
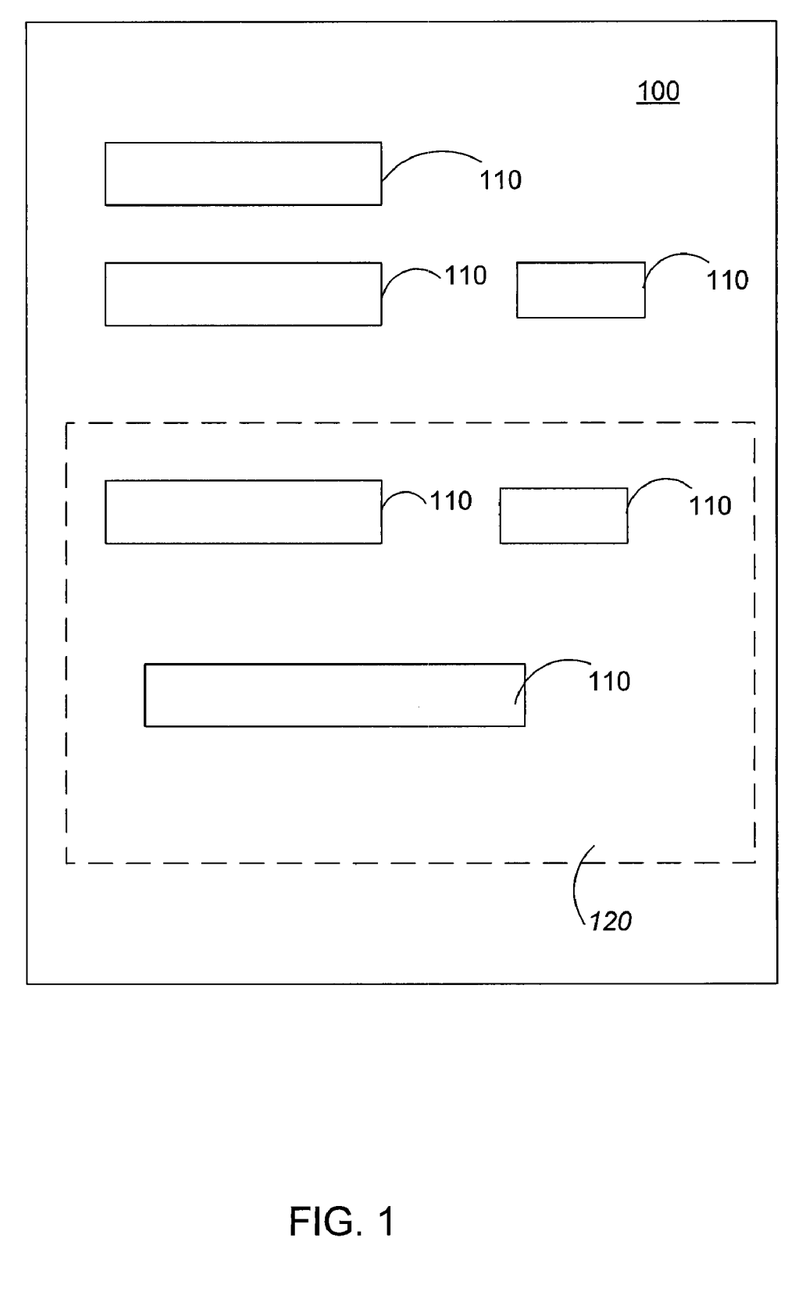
FIG. 1 is an illustration of an electronic document including repurposable information that can be signed.

As shown in FIG. 1, a electronic document 100 includes information, such as text, form fields, graphics, and images. In the example shown in FIG. 1, electronic document 100 is an electronic form that includes fields 110 that can be configured for interaction with (such as data entry by) a user. At least some information of an electronic document 100 cannot be entered or changed by a user, such as the text or graphics that describes what information a user is expected to insert in a field of a form. In this specification, the unchangeable information of an electronic document will be referred to as a template of the electronic document. For example, in a form including a field for a user's name, text reciting "NAME" next to form field for receiving the user's name is part of the form's template. An electronic document does not necessarily correspond to a file. A document may be stored in a portion of a file that holds other documents, in a single file dedicated to the document in question, or in multiple coordinated files.

An author of electronic document 100 can designate some or all of the information of the electronic document as being subject to repurposing by a user. In this specification, "repurposing" refers to the use of information of an electronic document in a context other than that of the original electronic document, such as in a different electronic document, in a different workflow or computer program application, including a table in a database, or by a different user. An author of an electronic document is a person or entity that defines information in the electronic document, including template and interactive fields, whether by generating text, graphics, images or other information of the document, by arranging or publishing that information (e.g., by defining a presentation format for the information), or by defining one or more terms of or constraints on uses that can be made of the information. Thus, for example, the author of a form can be a person who defines fields for entering data into the form.

Figure 2:
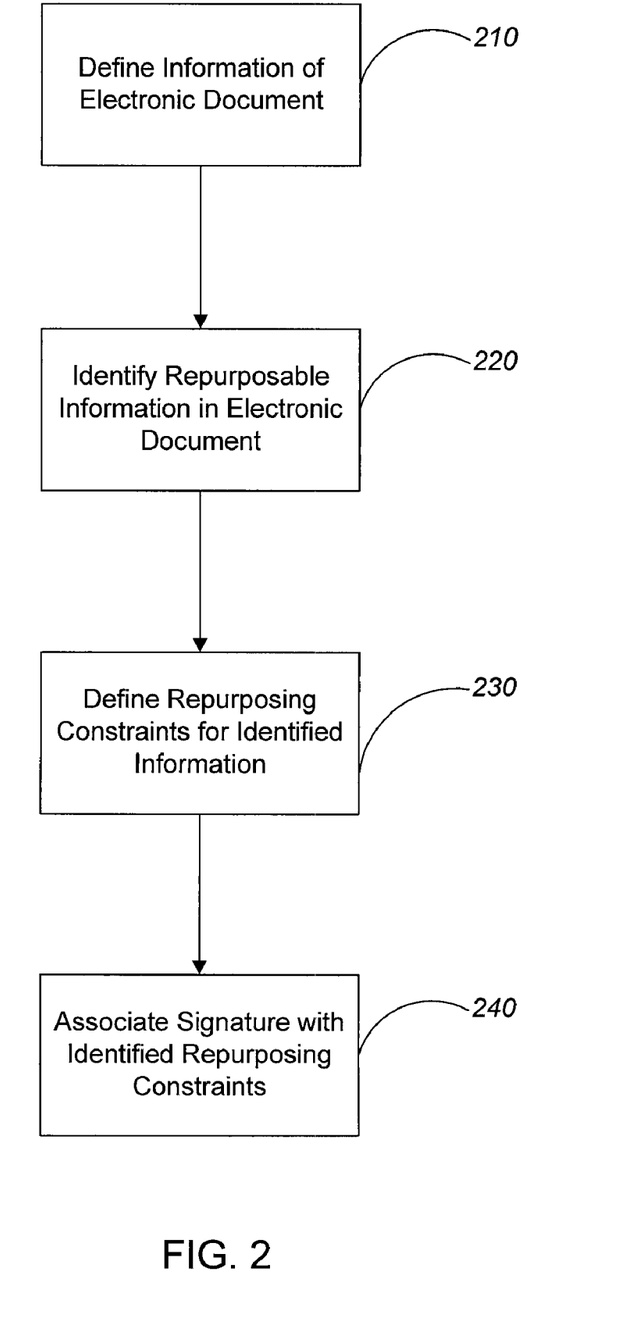
FIG. 2 is a flow diagram illustrating an implementation of a method for generating signed repurposable information in an electronic document.

FIG. 2 is a flow diagram illustrating an implementation of a method for defining repurposable information in an electronic document. Information is defined for an electronic document (step 210). The information can be defined by an author of the electronic document. The information in the electronic document can include a template and one or more fields for receiving user input, as defined by an author.

Repurposable information is identified in an electronic document (step 220). An author of the electronic document can identify and designate information in the electronic document as repurposable information. Repurposable information can include any information in or to be received into the electronic document. For example, repurposable information can include style information, such as a logo, a seal or template for a letterhead, as well as text information entered by an author or a user. To designate particular information of electronic document 100 as being subject to repurposing, the author identifies the information in question as a subset 120 of the information of the parent electronic document 100. In the example of FIG. 1, the author has identified a subset 120 that includes three of the form fields 110 of electronic document 100. The author can identify any number of subsets in the parent electronic document. The identified subsets can be nested within one another, or can overlap. For example, a subset A can include the first twenty fields of a form having thirty fields while a subset B can include the last twenty fields of the form. The author makes the information associated with a particular subset available for repurposing by designating the subset as being repurposable—for example, by setting a Boolean "Repurposable" attribute associated with the subset.

One or more repurposing constraints are defined for the identified repurposable information (step 230). Repurposing constraints can be defined by an author of the electronic document by specifying terms of or constraints on use that can be made of the repurposable information. Different repurposing constraints can be defined for different repurposable information. The author can define repurposing constraints by designating a destination or destinations for the repurposable information. A destination is a particular user, electronic document, process (such as a computer application), or workflow that can make use of designated information (e.g., designated subsets of information) from a parent electronic document. A destination can represent one or more operations capable of being performed on designated information, or a document in which the designated information can be used. The operations can include a variety of operations, such as processing the designated information (e.g., using values from the designated information in calculations or authorizations), or merely displaying the designated information—such as, in a different form. Authorized uses of the designated information can also include displaying the designated information in an arrangement different from an original arrangement of the designated information. According to this specification, the term "arrangement" can encompass style, layout, format or medium.

Thus, a destination or destinations can be designated for a particular subset 120 of information by an author of the parent electronic document 100. An author of a parent electronic document can designate one or more destinations for a particular subset of information by associating a destination identifier or identifiers identifying the destination or destinations with the particular subset as an attribute of the subset. An author can select designations to indicate whether particular information is available to a destination. For example, the author can designate information as (1) not available to a specified destination, (2) available to the specified destination if included with other authorized data (i.e., a signature), or (3) available to the destination but not usable as signed information. Fields designated according to the last of these can be made available to the specified destination, but the destination would not be able to use the data in the field as signed data.

When a destination is designated for information in an electronic document, a destination identifier for the destination is associated with the information and/or the electronic document, such that the definition of the document changes to include the destination. In some implementations, destinations can be transitive, such that designation of a particular destination implicitly designates any other destinations associated with that destination. Thus, for example, if doc2 is a destination of doc1, a designation of doc1 as a destination for a particular subset of information can automatically carry through to doc2 as well, such that the information can be used as signed in both doc1 and doc2. In particular implementations, such transitive relationships should be defined from "final" to first. For example, if three documents are related so that doc2 is a destination of doc 1 and doc3 is a destination of doc2, if a designation of doc1 is to be transitive to doc3, the definition of doc2 must include that doc3 is a destination of doc2 before doc1 designates doc2 as a destination. The "definition" of doc2, which includes the repurposing constraint designating destination doc2, is changed when doc3 is designated a destination of doc2—i.e., doc2 is "redefined", becoming doc2'. In this case, if doc2 is designated as a destination of doc1 before doc3 is designated as a destination of doc2 (i.e., before the definition of doc2'), doc1 does not recognize doc2' as a destination, and doc3 is not a valid destination of doc1. However, if doc1 designates doc2' as a destination instead of doc2, then doc3 is a valid subsequent destination.

A destination can be a "virtual" destination or destination proxy. A destination proxy is essentially a placeholder that can be designated as a destination for repurposable information. One or more destinations can be associated with the destination proxy, such that any information for which the destination proxy is designated can be repurposed in any destination associated with the destination proxy. By using a destination proxy, it is possible to provide for changing destinations—i.e., the destinations associated with the destination proxy can be changed after the destination proxy is designated for a particular item of information, and the information can be repurposed in the changed destinations without requiring a new designation. A signature or other authorization attached to the information by the destination proxy can validate the destination(s) designated by the destination proxy.

A destination or destinations can also be designated for particular information by a user of the parent electronic document 100. As used in this specification, a user of a document is a person or entity that uses or manipulates information of the electronic document. For example, a user can input data into form fields 110 of an electronic document 100. A user can be (but need not necessarily be) an author of the electronic document (i.e., a user can generate, arrange, publish, or define repurposing constraints on information of the document).

A digital signature is associated with the repurposable information and corresponding repurposing constraints (step 240). For example, one or more destination identifiers for the corresponding repurposing constraints can be encoded in the signed parent document. The digital signature can be applied by a user to selected information—e.g., the fields 110 in the subset 120—and the associated repurposing constraints. Alternatively, the user can apply a single digital signature to the entire document, and the digital signature can be automatically applied to each repurposable subset of information and to the associated repurposing constraints. The signature can be applied in different ways, depending on the implementation. In one implementation, when a user signs a parent electronic document, the user's signature is appended to each repurposable subset and stored in a file that is appended to the parent electronic document. Alternatively, when a user signs a parent electronic document, the user's signature is appended to each repurposable subset, and the subset signatures are integrated into the parent electronic document so that the subset signatures become part of the parent electronic document.

Each field 110 in the subset 120 is made available to a specified destination. Data can flow from fields 110 in document 100 to fields in the destination based on authorization. The author can specify one or more destinations for each subset 120. The author can ensure that each specified destination can only use the fields 110 in each subset 120 for authorized purposes. For example, the fields 110 in the subset can be made available to the specified destination only in the context of a signature. One technique for specifying destinations can include taking a hash of each destination and then making the hash of each destination available to a subset for which the destination is approved. The hash of the destination can be taken over a document template or object code for an application that the destination represents. A hash of the destination document template or application can be used to signify that the data in the subset 120 is signed only in the context of a document or application satisfying the hash. A hash can be taken by generating a number from a string of text using a formula that creates a high probability that the hash value for a particular string of text will be unique. Thus, if the destination is a document, a hash of the document template is taken and embedded with the document 100 template created by the author. If the destination is a process, such as a computer program, a hash is taken over the computer program code and embedded with the document 100 template. To specify a particular user as a destination, user credentials can be made available to a subset for which the destination (user) is approved. For example, a user credential can include a public certificate in a public/private key pair. The user credential is associated with (e.g., appended to) the subset, and the combination of subset and credential is digitally signed. Thereafter, a user signing with the proper credential (e.g., public certificate) will be able to repurpose the repurposable subset(s) to which the user credentials have been made available.

The author can also assign designations to a field to be viewable by a specified destination if the field is not in a subset that repurposable by the specified destination.

Figure 3:
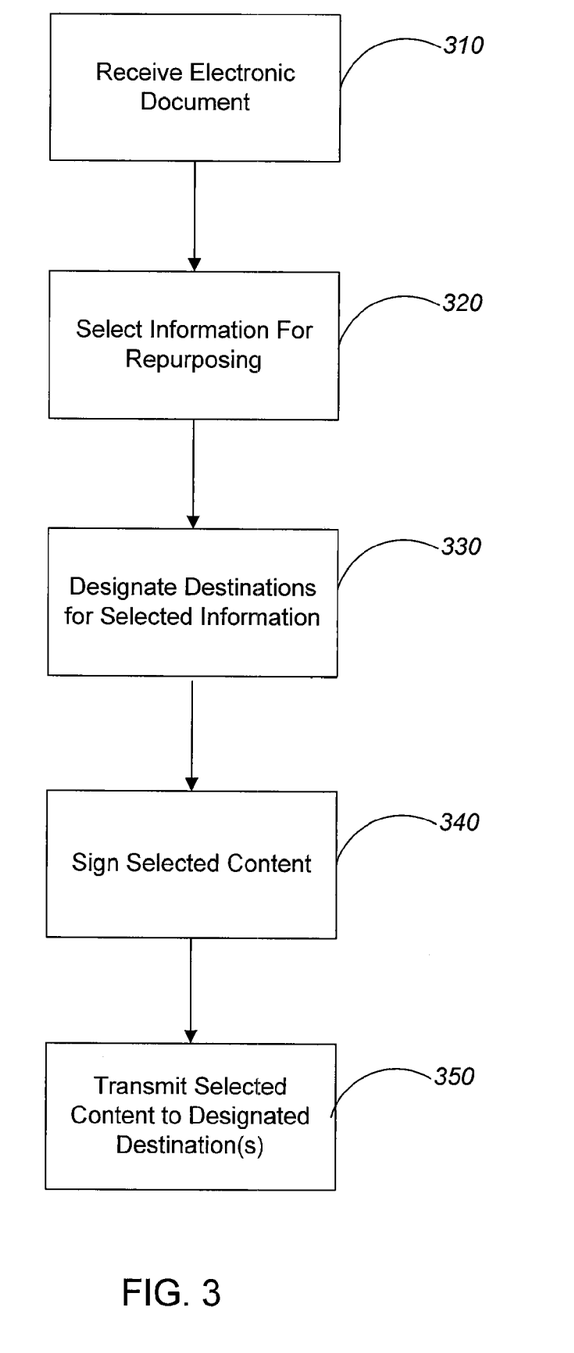
FIG. 3 is a flow diagram illustrating an implementation of a method for using user input for generating signed repurposable information.

FIG. 3 is a flow diagram illustrating an implementation of a method for using repurposable information. An electronic document is received in a user system (step 310). The electronic document can be received through a network or from a storage medium, such as a disk or a CD-ROM.

Information for repurposing is selected from the electronic document (step 320). The information for repurposing can be selected based on predetermined selection information or based on user selection. The user provides information to the electronic document by entering data or by selecting information to be entered into fields of one or more subsets that have been designated for repurposing by the author of the document for repurposing, as described above. The user input can include input text or user selection of predefined values. For example, an electronic document including a plurality of fields can be displayed to a user, and the user can type data directly into the displayed fields.

The display of the electronic document can include representations of fields that are part of one or more repurposable subsets of information. The user may or may not be made aware of the repurposable subsets of information or the destinations that are able to repurpose the information in the subsets of information. If the user is unaware of the repurposable subsets, the information for repurposing can be selected by the system on which the electronic document is displayed based on factors such as what type of data the user input, which fields have user input data, information that is defined by the author as to always be repurposed and/or other factors defined by the author of the electronic document. If the user is made aware which information is repurposable, the user can select one or more repurposable subsets to be repurposed with the user's signature.

Destinations for the selected information can be designated (step 330). The destinations can be designated based factors such as the type of data input by the user, which fields have user input data, destinations that the author has defined as always designated for one or more subsets, and/or other author defined factors. In one implementation, the user can select the destinations for the selected information. For example, the user can be presented with specified destinations available for the electronic document and/or for each subset of repurposable information of the electronic document, and the user can select one or more of those destinations.

A user of the parent document can similarly designate a destination or destinations for a subset by associating a corresponding destination identifier or identifiers with the subset, which can include selecting a desired destination or destinations from a collection of destinations designated by an author of the parent electronic document—for example, by selecting a desired destination from a list of author-designated destinations presented to the user in a graphical user interface.

Designating destinations can include associating a destination identifier with one or more fields in the information. The destination identifier ties the signature input by the user to a specific output (document, user, process, etc., as discussed above), and can be embedded in the electronic document 100. The destination identifier can include an identifier pointing to and describing the specified destination. For example, the destination identifier can include the hash or user credentials of the destination. A document identifier can also be assigned to each specified subset of information when the document has been completed by a user. A document identifier can be an identifier pointing back to the original complete document. The document identifier can include a hash of the original document or a pointer to the original document. Thus, the document identifier can point to the completed document and the destination identifier can point to the specified destination.

The user applies a digital signature to the selected information and corresponding destination identifiers (step 340). A user can apply a single digital signature to the document 100, such that the signature attaches to fields 110 for each subset 120 (and to the corresponding destination identifiers); alternatively, the user can apply a digital signature to each subset 120 and any corresponding destination identifiers individually.

The selected information is transmitted to specified destinations (step 350), where it can be repurposed subject to the designated repurposing constraints.

In one implementation, the data in the fields 110 can be encrypted. A decryption key can be sent to each approved destination. The decryption key can be used to decrypt the encrypted data. Only destinations having an appropriate decryption key can access the information of the fields.

Figure 4:
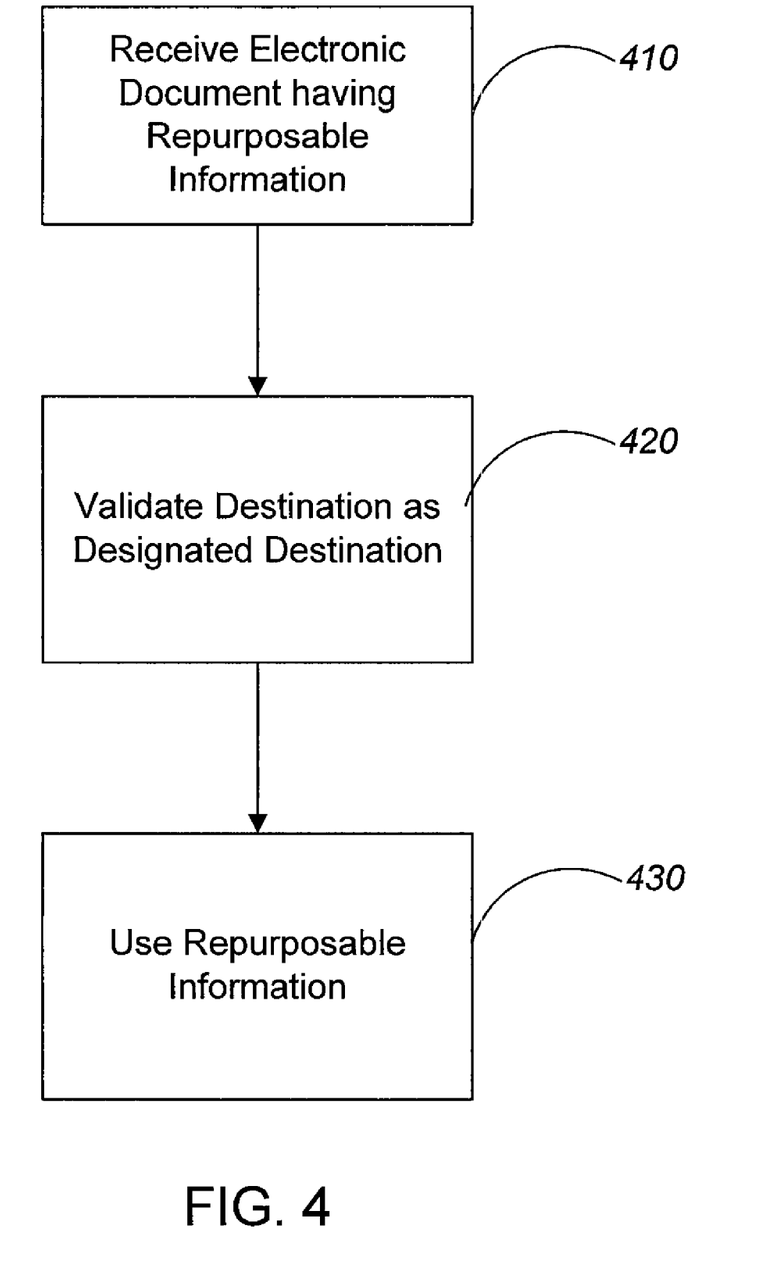
FIG. 4 is a flow diagram illustrating an implementation of a method for using a document having signed repurposable information.

FIG. 4 is a flow diagram illustrating an implementation of a method for using signed repurposable information from an electronic document. A destination receives an electronic document that includes information that has been designated as repurposable (step 410). Receiving the electronic document can also include receiving repurposing constraints such as an identifier indicating which document or application can use the designated subset(s) of information as signed information. The identifier can include a hash of the destination. The identifier can be encrypted. If the identifier is encrypted, the destination can receive a decryption key with which to decrypt the identifier, and use the subset(s) of information as signed information.

The destination validates that the destination is designated by a signature attached to the electronic document (step 420). The destination can validate that it is a designated destination by verifying information encoded in the signature. For example, if a destination identifier includes a hash of a designated destination, the destination receiving the electronic document can compare a hash of itself to the hash encoded in the signature. If the hash is encrypted, the designated destination is also required to decrypt the hash before validation and using the designated subset of information.

The destination can then use the designated subset(s) of information as signed information (step 430). For example, where the destination is a form document containing one or more fields, the destination map information in the received electronic document (i.e., the designated subsets) to fields in the destination form by identifying fields that match fields in the received electronic documents, and can then use the repurposable information in the matching fields. Matching fields can be defined in mapping rules that can be included as part of the destination identifier in the received electronic document.

Figure 5A:
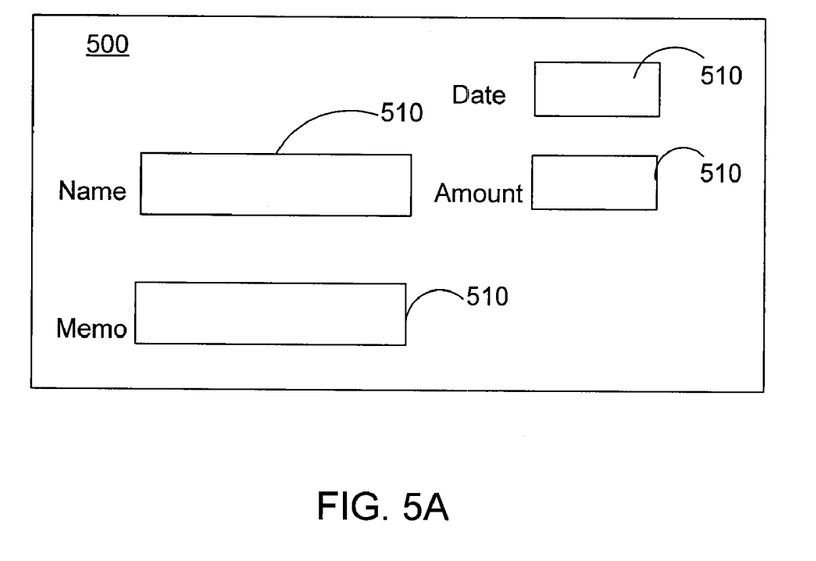
FIGS. 5A and 5B are illustrations of a check including repurposable information that can be signed.
Figure 5B:
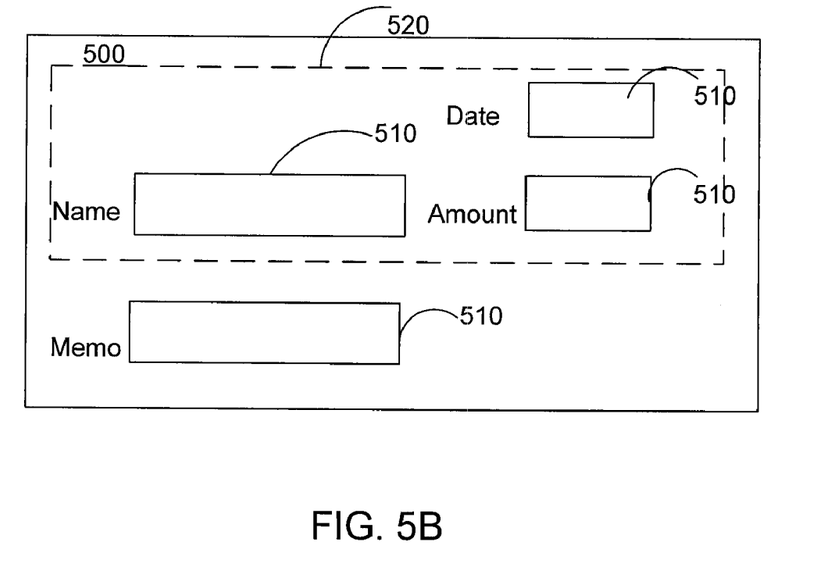

FIGS. 5A and 5B illustrate one implementation of a system according to one aspect of the invention providing a check form 500 including fields 510. The check form 500 can be designed by an entity, such as a corporation, to allow repurposing of the form information for different destinations. The destinations can include, for example, a bank or a corporate accounting department. The check form 500 can include fields 510 for "Date," "Name," "Amount" and "Memo." Different entities receiving the check form 500 may be interested in different fields 510 of the check form 500. For example, a bank may require access only to the fields "Date," "Name," and "Amount," but not "Memo." By contrast, a corporate accounting department might require access to the "Memo" field as well.

The entity can design the check form 500 with fields that are useful for all of the different destinations. Then, the entity can designate subsets of information as repurposable, and assign each destination to the appropriate repurposable subset. Thus, to provide a single form for making data available to both the bank and accounting, the form's author would designate the fields of "Date," "Name" and "Amount" as a subset 520 to be available to the bank, and a different subset to be available to accounting.

In operation, the system displays an empty check form 500 to a user through a graphical user interface. To make a payment, the user fills in the fields 510 on the displayed check 500 and signs the check 500. When the user signs the check 500, the system attaches repurposing authorizations to fields in each subset 520. For example, a bank can be authorized to use fields "Date," "Name" and "Amount" for certain applications, such as calculating balance information.

Figure 6:
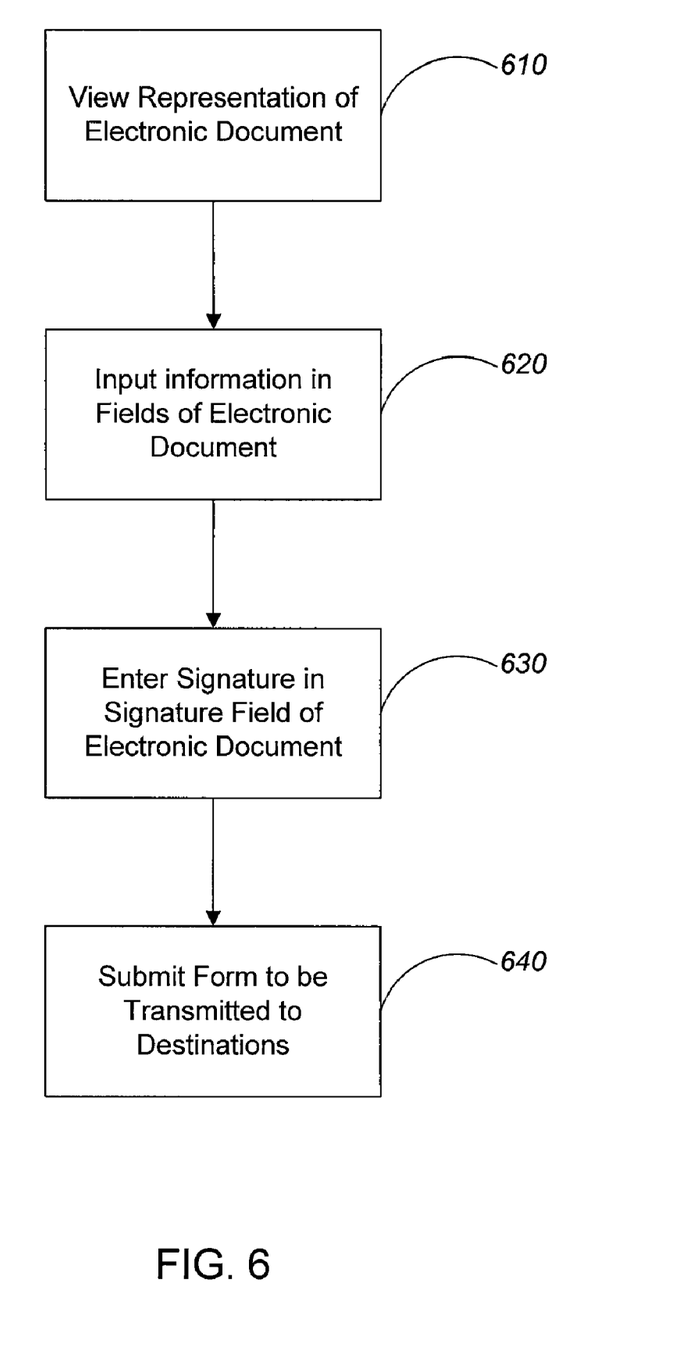
FIG. 6 is a flow diagram illustrating an implementation of a method for signing a subset of data for repurposing.

FIG. 6 is a flow diagram illustrating an implementation of a method for signing an electronic document. A user can view a representation of an electronic document (step 610). The representation can include one or more fields for the user to input information. The fields can include a signature field for the user to sign the completed document.

The user inputs information in the fields of the representation of the electronic document (step 620). Inputting information can include entering information in the field or selecting a control specifying a value to be input in the field. Inputting information can also include selecting one or more destinations to which to send the electronic document and/or designating one or more subsets of information to be made available to a specified destination. Selecting, a destination can include selecting one or more destinations from one or more destinations presented to the user in the representation of the electronic document. The destinations presented to the user can include destinations selected by the author of the electronic document. Designating repurposable information can include selecting a subset from one or more predefined subsets of information or selecting fields to be included in a user defined subset of information.

When the user has completed inputting information in the fields of the representation of the electronic document, the user can enter a signature in a signature field of the electronic document (step 630). The signature can be entered using methods available for entering a signature that are available through the display tool or application used to view the electronic document. For example, a signature can be entered by selecting the signature and entering a previously set password to verify the signature.

The user can then submit the form to transmit the electronic document to specified destinations (step 640).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results (e.g., choosing destinations can be performed either before or after filling out form data).

What is claimed is:

1. A computer-implemented method comprising:
    identifying, by a data processing apparatus, repurposable information in an electronic document, the repurposable information being less than all of the content in the electronic document;
    defining one or more repurposing constraints for the repurposable information, the repurposing constraints identifying an authorized destination for the repurposable information; and
    receiving a digital signature for the repurposable information and the one or more repurposing constraints with a digital signature, the digital signature authenticating the repurposable information, the digital signature verifying that the repurposable information has not been altered since it was signed, the digital signature being maintained by the authorized destination when the repurposable information is repurposed.

2. The method of claim 1, wherein:
identifying repurposable information in an electronic document includes designating a subset of information as being repurposable, the designated subset including less than all of the information in the electronic document.

3. The method of claim 1, further comprising:
receiving the repurposable information in a receiving destination;
validating that the receiving destination corresponds to the authorized destination; and
using the repurposable information as signed information in the receiving destination.

4. The method of claim 1, further comprising
encrypting the digital signature; and
providing the designated destination with a decryption key to decrypt the digital signature.

5. The method of claim 4, further comprising:
decrypting the digital signature with the decryption key.

6. The method of claim 1, wherein the destination represents one or more operations capable of being performed on the repurposable information or a document in which the repurposable information can be used.

7. The method of claim 6, wherein the one or more operations include displaying the repurposable information.

8. The method of claim 7, wherein displaying the repurposable information includes displaying the repurposable information in an arrangement different from an original arrangement in which the repurposable information is displayed.

9. The method of claim 1, wherein the destination represents a user authorized to repurpose the repurposable information.

10. The method of claim 1, further comprising creating a template defining the destination.

11. The method of claim 1, wherein identifying repurposable information includes identifying repurposable information in response to user input.

12. The method of claim 1, further comprising:
creating a template including one or more subsets of information in the electronic document;
wherein identifying repurposable information includes designating at least one of the one or more subsets of information as repurposable.

13. The method of claim 12, further comprising assigning a signature to at least one of the one or more subsets of information.

14. A computer program product, tangibly stored on a computer-readable storage device, the product comprising instructions operable to cause a computer system to:
identify repurposable information in an electronic document, the repurposable information being less than all of the content in the electronic document;
define one or more repurposing constraints for the repurposable information, the repurposing constraints identifying an authorized destination for the repurposable information; and
receiving a digital signature for the repurposable information and the one or more repurposing constraints, the digital signature authenticating the repurposable information, the digital signature verifying that the repurposable information has not been altered since it was signed, the digital signature being maintained by the authorized destination when the repurposable information is repurposed.

15. The computer program product of claim 14, wherein the instructions operable to cause a computer system to identify repurposable information in an electronic document include instructions operable to cause a computer system to:
designate a subset of information as being repurposable, the designated subset including less than all of the information in the electronic document.

16. The computer program product of claim 14, further comprising instructions operable to cause a computer system to:
receive the repurposable information in a receiving destination;
validate that the receiving destination corresponds to the authorized destination; and
use the repurposable information as signed information in the receiving destination.

17. The computer program product of claim 14, further comprising instructions operable to cause a computer system to:
encrypt the digital signature; and
provide the designated destination with a decryption key to decrypt the digital signature.

18. The computer program product of claim 17, further comprising instructions operable to cause a computer system to:
decrypt the digital signature with the decryption key.

19. The computer program product of claim 14, wherein the destination represents one or more operations capable of being performed on the repurposable information or a document in which the repurposable information can be used.

20. The computer program product of claim 19, wherein the one or more operations include displaying the repurposable information.

21. The computer program product of claim 20, wherein displaying the repurposable information includes displaying the repurposable information in an arrangement different from an original arrangement in which the repurposable information is displayed.

22. The computer program product of claim 14, wherein the destination represents a user authorized to repurpose the repurposable information.

23. The computer program product of claim 14, further comprising instructions operable to cause a computer system to create a template defining the destination.

24. The computer program product of claim 14, wherein the instructions operable to cause a computer system to identify repurposable information include instructions operable to cause a computer system to identify repurposable information in response to user input.

25. The computer program product of claim 14, further comprising instructions operable to cause a computer system to:
create a template including one or more subsets of information in the electronic document;
wherein the instructions operable to cause a computer system to identify repurposable information include instructions operable to cause a computer system to designate at least one of the one or more subsets of information as repurposable.

26. The computer program product of claim 25, further comprising instructions operable to cause a computer system to assign a signature to at least one of the one or more subsets of information.

27. A system comprising:
a computer-readable storage device including a program product;

a data processing apparatus configured to interact with the storage device and execute the program product to perform operations comprising:

identifying repurposable information in an electronic document, the repurposable information being less than all of the content in the electronic document;

defining one or more repurposing constraints for the repurposable information, the repurposing constraints identifying an authorized destination for the repurposable information; and receiving a digital signature for the repurposable information and the one or more repurposing constraints, the digital signature authenticating the repurposable information, the digital signature verifying that the repurposable information has not been altered since it was signed, the digital signature being maintained by the authorized destination when the repurposable information is repurposed.

28. The system of claim 27, wherein:

identifying repurposable information in an electronic document includes designating a subset of information as being repurposable, the designated subset including less than all of the information in the electronic document.

29. The system of claim 27, wherein the operations further comprise:

receiving the repurposable information in a receiving destination;

validating that the receiving destination corresponds to the authorized destination; and using the repurposable information as signed information in the receiving destination.

30. The system of claim 27, wherein the operations further comprise:

encrypting the digital signature; and providing the designated destination with a decryption key to decrypt the digital signature.

31. The system of claim 30, wherein the operations further comprise:

decrypting the digital signature with the decryption key.

32. The system of claim 27, wherein the destination represents one or more second operations capable of being performed on the repurposable information or a document in which the repurposable information can be used.

33. The system of claim 32, wherein the one or more second operations include displaying the repurposable information.

34. The system of claim 33, wherein displaying the repurposable information includes displaying the repurposable information in an arrangement different from an original arrangement in which the repurposable information is displayed.

35. The system of claim 27, wherein the destination represents a user authorized to repurpose the repurposable information.

36. The system of claim 27, wherein the operations further comprise:

creating a template defining the destination.

37. The system of claim 27, wherein identifying repurposable information includes identifying repurposable information in response to user input.

38. The system of claim 27, wherein the operations further comprise:

creating a template including one or more subsets of information in the electronic document;

wherein identifying repurposable information includes designating at least one of the one or more subsets of information as repurposable.

39. The system of claim 38, wherein the operations further comprise:

assigning a signature to at least one of the one or more subsets of information.

* * * * *